US012769697B1

(12) United States Patent
Ichapurapu

(10) Patent No.: US 12,769,697 B1
(45) Date of Patent: Oct. 20, 2026

(54) WIRELESS CONNECTIVITY ARCHITECTURE WITH TILE RADIO FREQUENCY (RF) FRONT-END CIRCUITRY

(71) Applicant: Amazon Technologies, Inc., Seattle, WA (US)

(72) Inventor: Ravi Ichapurapu, Morgan Hill, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 62 days.

(21) Appl. No.: 18/807,725

(22) Filed: Aug. 16, 2024

(51) Int. Cl.
*G06F 13/36* (2006.01)
*G06F 13/42* (2006.01)
*G06K 19/07* (2006.01)

(52) U.S. Cl.
CPC ..... *G06F 13/4282* (2013.01); *G06K 19/0723* (2013.01); *G06F 2213/0002* (2013.01)

(58) Field of Classification Search
None
See application file for complete search history.

(56) References Cited

U.S. PATENT DOCUMENTS

| | | | | |
|---|---|---|---|---|
| 2019/0293755 | A1* | 9/2019 | Cohen | G01S 7/295 |
| 2021/0226660 | A1* | 7/2021 | Dantoni | H03F 1/3241 |
| 2024/0007160 | A1* | 1/2024 | Xu | H01Q 21/26 |
| 2024/0204807 | A1* | 6/2024 | Gao | H04B 1/0064 |

* cited by examiner

*Primary Examiner* — Henry Tsai
*Assistant Examiner* — Dean Phan
(74) *Attorney, Agent, or Firm* — K&L Gates LLP

(57) ABSTRACT

Technologies related to wireless connectivity architectures with tile radio frequency (RF) integrated circuits are described. A wireless communication subsystem includes multiple RF tiles, each of the RF tiles including identical hardware comprising a first serializer/deserializer (SerDes) interface circuit and at least two radio frequency front-end (RFFE) circuits. Each of the at least two RFFE circuits corresponding to one of multiple radio technologies. The wireless communication subsystem includes multiple baseband processors. Each of the baseband processors implementing one of the radio technologies. The wireless communication subsystem also includes a second SerDes interface circuit coupled between the baseband processors and the first SerDes interface circuit of each of the RF tiles.

20 Claims, 8 Drawing Sheets

WIRELESS CONNECTIVITY ARCHITECTURE WITH TILE RADIO FREQUENCY (RF) FRONT-END CIRCUITRY

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, Personal Digital Assistants (PDAs), portable media players, tablet computers, netbooks, laptops, and the like. These electronic devices wirelessly communicate with a communications infrastructure to enable the consumption of digital media items. In order to communicate with other devices wirelessly, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Technologies related to wireless connectivity architectures with tile radio frequency (RF) integrated circuits are described. The present application discloses one or more implementations of a wireless device or a wireless communication subsystem with RF tiles to enable scaling of multiple wireless connectivity configurations while consolidating data and control lines between the RF tiles and baseband circuitry. Conventional wireless subsystems for consumer devices typically include wireless connectivity subsystems (also referred to as IP blocks) from multiple vendors to implement different radio technologies, such as Wi-Fi® (2.4, 5, and 6 GHZ), Bluetooth®, BLE, and Zigbee® (IEEE 802.15.4). Each of these wireless connectivity subsystems can operate on their own, but can also be integrated into a common wireless subsystem for a consumer product. There is a lot of design and manufacturing costs associated with verifying new designs that use different combinations of radio technologies.

Aspects and embodiments of the present disclosure overcome these deficiencies and others by providing a scalable solution to achieve different combinations of radio technologies with an RF tile architecture. For example, wireless connectivity subsystems from three separate suppliers can be integrated into two RF tiles and coupled to consolidated baseband circuitry, as described herein. In accordance with one or more implementations, a SerDes interface and a consolidated SPI interface can be used between multiple RF tiles to enable three separate modes: a 1×1 Single Stream Triple Band, 2×2 Multiple Input Multiple Output (MIMO) Dual Stream Triple Band, and 1×1 Dual Stream Two-Band Synchronous. This can enable a single RFIC tape-out to support both a 1×1 configuration and a 2×2 configuration through a package option. In the 2×2 package option, an RF phase-locked loop (PLL) can be used across all RF tiles to maintain clock synchronization across an interconnect. To enable a Dual band Dual Concurrent (DBDC) 1+1 configuration without duplicating the full baseband, a fast-switching scheme can be used to allow the baseband to switch between RF tiles with minimal latency (e.g., <1 ms latency) to enable uses cases like home theater systems.

Figure 1:
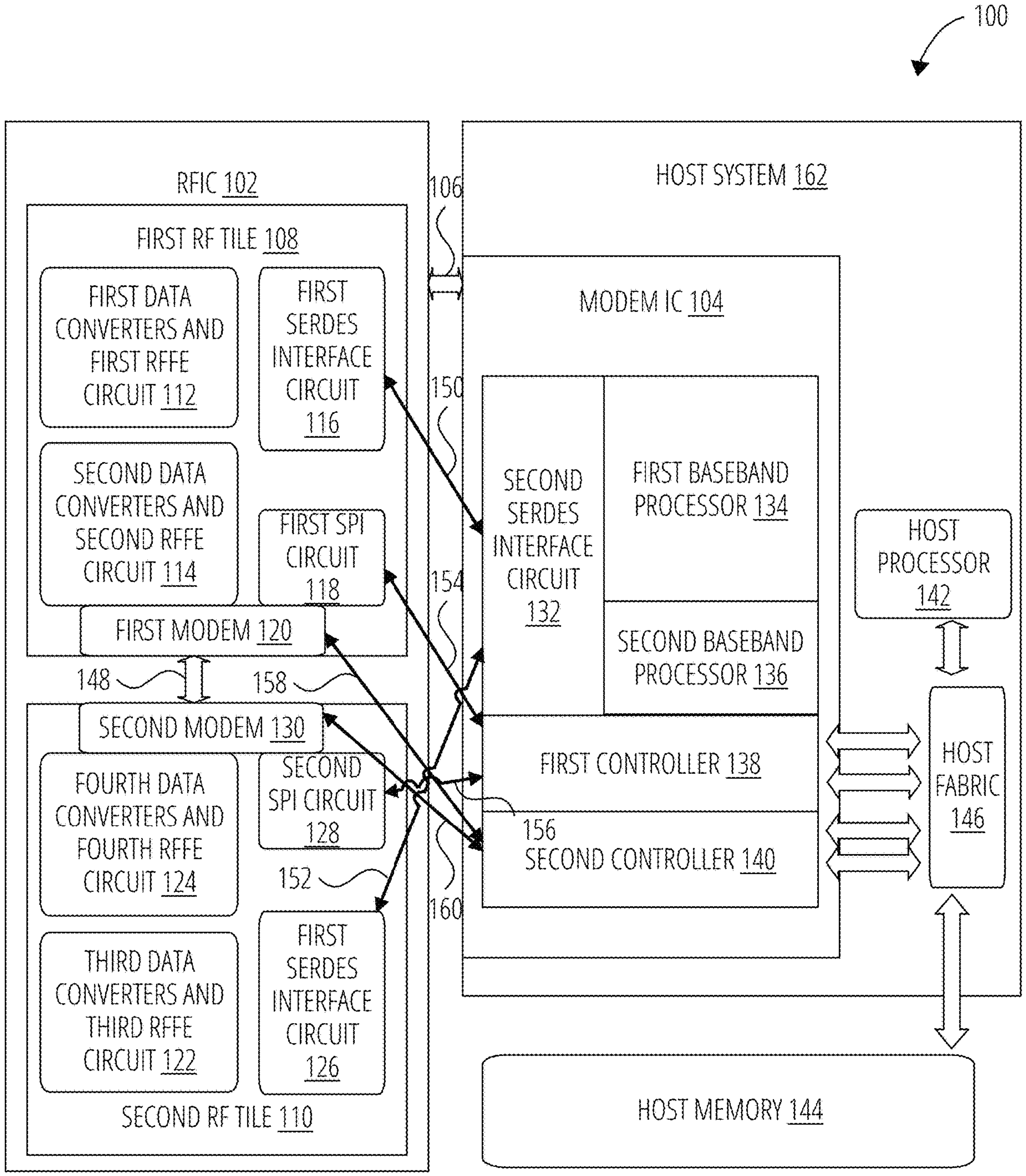
FIG. 1 is a block diagram of a wireless communication subsystem with a radio frequency integrated circuit (RFIC) with multiple RF tiles and a modem IC according to at least one embodiment.

FIG. 1 is a block diagram of a wireless communication subsystem 100 with an RFIC 102 with multiple RF tiles 108, 110, and a modem IC 104 according to at least one embodiment. The RFIC 102 is coupled to the modem IC 104 via an interconnect 106. As illustrated in FIG. 1, the RFIC 102 includes a first RF tile 108 and a second RF tile 110. The first RF tile 108 can be operatively coupled to the second RF tile 110 with an interconnect 148 for clock synchronization as described in more detail below. In other embodiments, the RFIC 102 can include more than two RF tiles, such as 3, 4, 6, 8, etc. The RF tiles can include identical components. Although illustrated in different positions within the RF tile blocks, the components can be located in identical positions across the RF tiles. As illustrated in FIG. 1, the first RF tile 108 includes first data converters and first radio frequency front-end (RFFE) circuit 112, second data converters and second RFFE circuit 114, a first SerDes interface circuit 116, a first SPI circuit 118, and a first modem 120. The second RF tile 110 includes third data converters and third RFFE circuit 122, fourth data converters and fourth RFFE circuit 124, a first SerDes interface circuit 126, a second SPI circuit 128, and a second modem 130.

As illustrated in FIG. 1, the modem IC 104 includes a second SerDes interface circuit 132, a first baseband processor 134, a second baseband processor 136, a first controller 138, and a second controller 140. The modem IC 104 can be part of a host system 162, which also includes a host processor 142, a host memory 144, and a host fabric 146. In at least one embodiment, the modem IC 104 and the host processor 142 can be integrated into a SoC or a single IC package. In other embodiments, the modem IC 104 can include more than two baseband processors. In other embodiments, the functionality of the first controller 138 and second controller 140 can be implemented in connection with the respective baseband processors.

The interconnect 106 can be a physical connection that enables communication between the RFIC 102 and the modem IC 104. The interconnect 106 can include multiple conductive pathways that facilitate the transfer of electrical signals or power from one point to another. These connections can be made through various means including wires, printed circuit board (PCB) traces, connectors, or through silicon in the case of integrated circuits. The interconnect 106 can include dedicated physical connections between individual components of the RFIC 102 and modem IC 104. The interconnect 106 can include logical connections between the individual components of the RFIC 102 and modem IC 104. The logical connection can be created over the physical connections of the interconnect 106. As illustrated in FIG. 1, there can be a connection 150 between the first SerDes interface circuit 116 and the second SerDes interface circuit 132, and a connection 152 between the first SerDes interface circuit 126 and the second SerDes interface circuit 132. The connection 150 and the connection 152 can be higher-speed SerDes links (e.g., ×6) between the respective devices. Similarly, there can be a connection 154 between the first SPI circuit 118 and the first controller 138, and a connection 156 between the second SPI circuit 128 and the first controller 138. Similarly, there can be a connection 158 between the first modem 120 and the second controller 140, and a connection 160 between the second modem 130 and the second controller 140. The connections 154-160 can be lower-speed SPI links that have slower speeds than the higher-speed SerDes links. The interconnect 106 can include multiple data lines and one or more clock lines.

As described herein, the wireless communication subsystem 100 can be used for multiple radio technologies. That is, the RF tile (108, 110) can support multiple radio technologies, such as wireless local area network (WLAN) technology, such as the Wi-Fi® technology, a wireless personal area network (WPAN) technology, such as Bluetooth® and Bluetooth Low Energy (BLE) technologies, and an ad hoc network technology, such as the IEEE 802.15.4 technologies like Zigbee®. Ad hoc network technology refers to a network architecture where nodes communicate directly with each other without relying on a pre-existing infrastructure or centralized administration. In ad hoc networks, each node participates in routing by forwarding data for other nodes, and thus, the determination of which nodes will forward data is made dynamically based on the network connectivity. This type of network is self-configuring and can operate in a standalone fashion or could be connected to a larger network. Ad hoc networks are particularly useful in situations where network deployment is temporary, or where it is not feasible to build a fixed infrastructure, such as in disaster recovery, military operations, mobile computing, and sensor networks.

Multiple RF tiles can be used to achieve different configurations for the wireless communication subsystem 100. For example, the wireless communication subsystem 100 can achieve different configurations, such as 1×1, 2×2 WLAN configurations using the RF tiles. For example, the first data converters and first RFFE circuit 112 can be configured for a first radio technology, such as the Wi-Fi® technology. The first data converters can include one or more digital-to-analog converters (DACs) and one or more analog-to-digital converters (ADCs). The first SerDes interface circuit 116 and the second SerDes interface circuit 132 can be used to send digital in-phase and quadrature (IQ) data and control signals between the first data converters and first RFFE circuit 112 and the first baseband processor 134. The first SPI circuit 118 can be used to send data and control signals to the first controller 138. In at least one embodiment, the first controller 138 can be a Wi-Fi® RISC-V microcontroller that handles radio control, firmware, and a soft media access control (soft-MAC) for the first baseband processor 134. RISC-V is an open standard instruction set architecture (ISA) based on the Reduced Instruction Set Computing (RISC) principles. RISC-V is designed to be scalable and efficient, supporting implementations from small microcontrollers to high-performance computing systems. Its modular design allows for extensive customization and extension, enabling the creation of specialized processors for various computing needs, including embedded systems, Internet of Things (IoT) devices, smartphones, and servers. In other embodiments, the first controller 138 can be implemented as a microcontroller, a processing device, a processing element, or digital logic. In other embodiments, the functionality of the first controller 138 can be implemented with the logic of the first baseband processor 134. By separating the functionality of the first baseband processor 134 and the first controller 138, the first controller 138 can handle radio control over the connection 154, while the connection 150 can be used for data at higher speeds. Alternatively, different combinations of data and control signals can be sent between the RFIC 102 and the modem IC 104 for operations of the first radio technology.

The second data converters and second RFFE circuit 114 can be configured for a second radio technology, such as the Bluetooth®. In another embodiment, the second data converters and second RFFE circuit 114 can support both the Bluetooth® and BLE technologies and the Zigbee® technology (or other IEEE 802.15.4 technologies). The first modem 120 can be configured for the second radio technologies (e.g., Bluetooth®/BLE/15.4). That is, the first modem 120 can include logic to handle operations for Bluetooth®, BLE, and 802.15.4. The second data converters can include one or more DACs and one or more ADCs. The first modem 120 can send data and control signals over the connection 158 to the second controller 140. In at least one embodiment, the second controller 140 is a BT/15.4 RISC-V microcontroller that handles radio control, firmware, and soft-MAC for the second baseband processor 136. In other embodiments, the second controller 140 can be implemented as a microcontroller, a processing device, a processing element, or digital logic. In other embodiments, the functionality of the second controller 140 can be implemented with the logic of the second baseband processor 136. By separating the functionality of the second baseband processor 136 and the second controller 140, the second controller 140 can handle data and radio control over the connection 158, while the connection 150 can be used for data and control at higher speeds for the first baseband processor 134. Alternatively, different combinations of data and control signals can be sent between the RFIC 102 and the modem IC 104 for operations of the second radio technologies.

Similarly, the third data converters and third RFFE circuit 122 can be configured for the first radio technology (e.g., Wi-Fi®), and the fourth data converters and fourth RFFE circuit 124 and second modem 130 are configured for the second radio technologies (e.g., Bluetooth®/BLE/15.4). Similarly, the first SerDes interface circuit 126 and the second SerDes interface circuit 132 can be used to send digital IQ data and control signals between the third data converters and third RFFE circuit 122 and the first baseband processor 134. The second SPI circuit 128 can be used to send data and control signals to the first controller 138.

In at least one embodiment, the first baseband processor 134 can be a 2×2 Wi-Fi® baseband processor (e.g., operates at 80 MHz). Because the first baseband processor 134 is a dual-band baseband processor, the first baseband processor 134 can be used with both the first RF tile 108 and the second RF tile 110. If more RF tiles were added, the first baseband processor 134 could have additional band capabilities, such as tri-band or a quad-band functionality. In other embodiments, additional Wi-Fi® baseband processors could be used based on the number of RF tiles added.

In at least one embodiment, the second baseband processor 136 is a dual BT/15.4 baseband processor. The second baseband processor 136 can handle multiple radio technologies, such as BT/BLE, 802.15.4 as described herein.

In at least one embodiment, the modem IC 104 includes the host processor 142, host fabric 146, and host memory 144. Although these components are not considered part of the wireless communication subsystem 100, they are illustrated in FIG. 1 to show that the first baseband processor 134, the second baseband processor 136, the first controller 138, and second controller 140 can be coupled to the host processor 142 and host memory 144 via the host fabric 146. For example, the modem IC 104 can be a host SoC with these components that is coupled to an RFIC 102 with the two RF tiles 108, 110. Alternatively, the RFIC 102 and modem IC 104 can be integrated on a common carrier substrate. In another embodiment, different combinations of the blocks illustrated in FIG. 1 can be implemented in one or more integrated circuits and/or packaged in one or more semiconductor packages.

In at least one embodiment, the wireless communication subsystem 100 can provide wireless connectivity subsystems (also referred to as ICs or blocks) that support 1×1 or 2×2 Wi-Fi6/6E (2.4 GHz, 5 GHZ, and 6 GHz), BT, BLE 5.2, and 802.15.4. These subsystems, as described herein, can be integrated into our different products, either as a standalone integrated circuit (also referred to as chip) or within a SoC. The wireless connectivity architecture described herein can enable the latest connectivity standards for Wi-Fi®, Bluetooth, BLE, 802.15.4 (e.g., ZigBee) while allowing customization and integration vertically across silicon, firmware, and software.

In at least one embodiment, the wireless communication subsystem 100 can be part of a wireless device. The wireless device can include a RFIC with a first RF tile and a second RF tile, and a modem IC. The first RF tile can include first data converters and a first RFFE circuit for a first radio technology, second data converters and a second RFFE circuit for a second radio technology, a first modem for the second radio technology, a first SerDes interface circuit, and a first serial peripheral interface (SPI) circuit. The second RF tile can include third data converters and a third RFFE circuit for the first radio technology, fourth data converters and a fourth RFFE circuit for the second radio technology, a second modem for the second radio technology, a second SerDes interface circuit, and a second SPI circuit. The modem IC can be operatively coupled to the RFIC. The modem IC can include a third SerDes interface circuit operatively coupled to the first and second SerDes interface circuits, a first baseband processor for the first radio technology, a first controller for the first radio technology, a second baseband processor for the second radio technology, and a second controller for the second radio technology. In other embodiments, different combinations of radio technologies can be achieved in an RF tile, allowing the grouping of multiple RF tiles to achieve different wireless connectivity architectures using the same silicon.

In at least one embodiment, the RFIC and the modem IC are integrated on a common carrier substrate. In at least one embodiment, the RFIC also includes a third RF tile operatively coupled to the modem IC, where the third RF tile and the first RF tile are identical, and a fourth RF tile operatively coupled to the modem IC, where the fourth RF tile and the second RF tile are identical. In at least one embodiment, the wireless communication subsystem 100 can include multiple RFICs. For example, In at least one embodiment, a second RFIC can be used with the RFIC described above. The second RFIC includes a third RF tile operatively coupled to the modem IC, where the third RF tile and the first RF tile are identical, and a fourth RF tile operatively coupled to the modem IC, where the fourth RF tile and the second RF tile are identical. The modem IC, the RFIC, and the second RFIC can be integrated on a common carrier substrate or integrated into a common semiconductor package.

In at least one embodiment, the first baseband processor 134 (e.g., the WiFi6 2×2 80 MHz baseband and dual BT/BLE 5.3 and 15.4 baseband and software stacks of the first and second controllers 138 and 140 can be provided by a first vendor, whereas the second data converters and second RFFE circuit 114 (e.g., BT/BLE 15.4 Radio and Modem) can be provided by a second vendor, and the first data converters and first RFFE circuit 112 (e.g., WiFi Radio) can be provided by a third provider. These components can be off-the-shelf IP blocks that have already been verified in silicon, whereas the SerDes interface circuits can be customized for operating at low power and reduce a number of input-outputs (IOs) between the IP blocks. The RF tiles can enable the wireless communication subsystem 100 to operates as a 1×1, 1+1, or 2×2 configurations. This can enable a single RFIC tape-out to support both a 1×1 configuration and a 2×2 configuration through a package option. In the 2×2 package option, an RF phase-locked loop (PLL) can be used across all RF tiles to maintain clock synchronization across the interconnect 148. To enable a Dual band Dual Concurrent (DBDC) 1+1 configuration without duplicating the full baseband, a fast-switching scheme can be used to allow the baseband to switch between RF tiles with minimal latency (e.g., <1 ms latency).

In at least one embodiment, the first baseband processor 134 and the second baseband processor 136 can be integrated into a single top-level block that includes connections between the underlying Wi-Fi and 15.4/Bluetooth Coexistence logic blocks. The single top-level block can be highly configurable with options for several interfaces and corresponding IO ports for interface consolidation.

In at least one embodiment, the second data converters and second RFFE circuit 114 and first modem 120 can be implemented as an ultra-low-power RF transceiver with a Bluetooth Classic physical (PHY) layer, including Basic Rate (BR) and Enhanced Data Rate (EDR) (e.g., 2 Mbps and 3 Mbps), a BLE PHY layer, including both Long Range (LR) and Direction-Finding options (e.g., 2 Mbps), a flexible PHY with data rates up to 3 Mbps and programmable baseband settings for supporting proprietary modes. The ultra-low-power RF transceiver can have typical consumption of 3.6 mW in RX BLE 1 Mbps (at maximum sensitivity) and 6.8 mW in TX BR/BLE @ +0 dBm (PA supplied at 0.6V, core at 0.8V). The RF transceiver can have a very high degree of integration with RF LDOs (low dropout voltage regulator) included (input voltage 0.94V), single-ended 50Ω RF port (i.e., no external matching components), one single external component only (e.g., the RF crystal). The RF transceiver can have a low cost in terms of analog silicon area (e.g., ~0.80 $mm^2$ and digital area ~0.28 mm2).

In at least one embodiment, the first data converters and first RFFE circuit 112 can be a triple-band 802.11ax RF block. It can support up to 2×2 transceiver (TRX) consolidated to 2 data streams, with DBDC. The RF block can provide advanced RX and TX design considerations to leverage new 802.11ax features such as resource-unit support and provides band coverage for the new WiFi 6e. This RF block can be capable of operating in 3 modes: 1×1 Single Stream Triple Band, RFIC 2×2 Multiple Input Multiple Output (MIMO) Dual Stream Triple Band, 1×1 Dual Stream Two-Band Synchronous. The RF block can support up to 1024 Quadrature Amplitude Modulation (QAM) with bandwidth support up to 160 MHz in all modes.

In at least one embodiment, the wireless communication subsystem 100 includes multiple RF tiles and multiple baseband processors. Each of the RF tiles including identical hardware comprising a first SerDes interface circuit and at least two RFFE circuits. Each of the at least two RFFE circuits corresponding to one of multiple radio technologies. Each of the baseband processors implement one of the radio technologies. The wireless communication subsystem also includes a second SerDes interface circuit coupled between the baseband processors and the first SerDes interface circuit of each of the RF tiles.

In a further embodiment, each of the RF tiles includes a first RF tile and a second RF tile. The first RF tile includes first data converters and a first RFFE circuit corresponding to a first radio technology of the plurality of radio technologies and second data converters and a second RFFE circuit corresponding to a second radio technology of the plurality of radio technologies. The first RF tile includes a first modem for the second radio technology, the first SerDes interface circuit, and a first SPI circuit. The second RF tile includes third data converters and a third RFFE circuit corresponding to the first radio technology and fourth data converters and a fourth RFFE circuit corresponding to the second radio technology. The second RF tile includes a second modem for the second radio technology, the first SerDes interface circuit, and a second SPI circuit.

In a further embodiment, the wireless communication subsystem 100 includes a first controller coupled to the first SPI circuit and the second SPI circuit, and a second controller coupled to the first modem and the second modem.

In a further embodiment, the wireless communication subsystem 100 includes a third RF tile operatively coupled to the second SerDes interface circuit, and a fourth RF tile operatively coupled to the second SerDes interface circuit. The third RF tile and the first RF tile are identical. The fourth RF tile and the second RF tile are identical.

In at least one embodiment, the multiple RF tiles, multiple baseband processors, and the second SerDes interface circuit are integrated on a common carrier substrate or integrated into a common semiconductor package. In at least one embodiment, the multiple RF tiles are integrated into a first integrated circuit, and the multiple baseband processors and the second SerDes interface circuit are integrated into a second integrated circuit. In at least one embodiment, the third RF tile and the fourth RF tile are integrated into the first integrated circuit.

In at least one embodiment, the wireless communication subsystem 100 includes multiple RF tiles and multiple baseband processors. Each of the RF tiles including identical hardware comprising a first analog interface circuit and at least two RFFE circuits. Each of the at least two RFFE circuits corresponding to one of multiple radio technologies. Each of the baseband processors implement one of the radio technologies. The wireless communication subsystem also includes a second analog interface circuit coupled between the baseband processors and the first analog interface circuit of each of the RF tiles. In this embodiment, each of the RF tiles do not include data converters, as the data converters are implemented on the modem IC. For example, a first tile includes a first RFFE circuit corresponding to a first radio technology of the plurality of radio technologies and a second RFFE circuit corresponding to a second radio technology of the plurality of radio technologies. The first RF tile includes a first modem for the second radio technology, the first analog interface circuit, and a first SPI circuit. The first SPI circuit can be a consolidate SPI for both data and control signaling with the modem IC. The first modem can send data to the second baseband processor over the consolidated SPI. The second RF tile includes a third RFFE circuit corresponding to the first radio technology and a fourth RFFE circuit corresponding to the second radio technology. The second RF tile includes a second modem for the second radio technology, the first analog interface circuit, and a second SPI circuit. In a further embodiment, the modem IC of the wireless communication subsystem 100 includes one or more data converters to convert the IQ signals (RF/analog domain) into the digital data (digital domain) and convert the digital data (digital domain) into the IQ signals (RF/analog domain). These data converters can be similar to the first, second, third, and fourth data converters described herein. In a further embodiment, the modem IC includes the multiple baseband processors for the different radio technologies. In a further embodiment, the modem IC includes a first controller coupled to the first SPI circuit and the second SPI circuit, and a second controller coupled to the first modem and the second modem.

In at least one embodiment, the wireless communication subsystem 100 is implemented as a System on Chip (SoC) with an RF subsystem and a modem subsystem. The SoC can include additional components, such as the application processor. The RF subsystem includes multiple RF tiles, each of the RF tiles include identical hardware. The identical hardware can include a first SerDes interface circuit and at least two RFFE circuits, each corresponding to one multiple radio technologies. The modem subsystem is operatively coupled to the RF subsystem. The modem subsystem includes multiple baseband processors, each implementing one of the multiple radio technologies. The modem IC also includes a second SerDes interface circuit coupled between the baseband processors and the first SerDes interface circuit of each of the multiple RF tiles. The RF subsystem and the modem subsystem can have similar components and configurations as described above.

In at least one embodiment, a SerDes interface can be used between the RF subsystem and the modem subsystem. This SerDes interface is designed to encapsulate all the data and control lines needed between the baseband logic and the RFIC logic in as few lines as possible with minimal changes to the silicon verified IP blocks. In at least one embodiment, the SerDes interface includes four primary sections, including: 1) Ser-Des Data and Control Path; 2) Consolidated SPI; 3) Clock Distribution; 4) Clock Recovery, Equalization, and IOs/Drivers, as described in detail below. Additional details of the SerDes data and control paths between the RF tiles (e.g., 108, 110) and modem IC 104 are described below with respect to FIG. 2.

Figure 2:
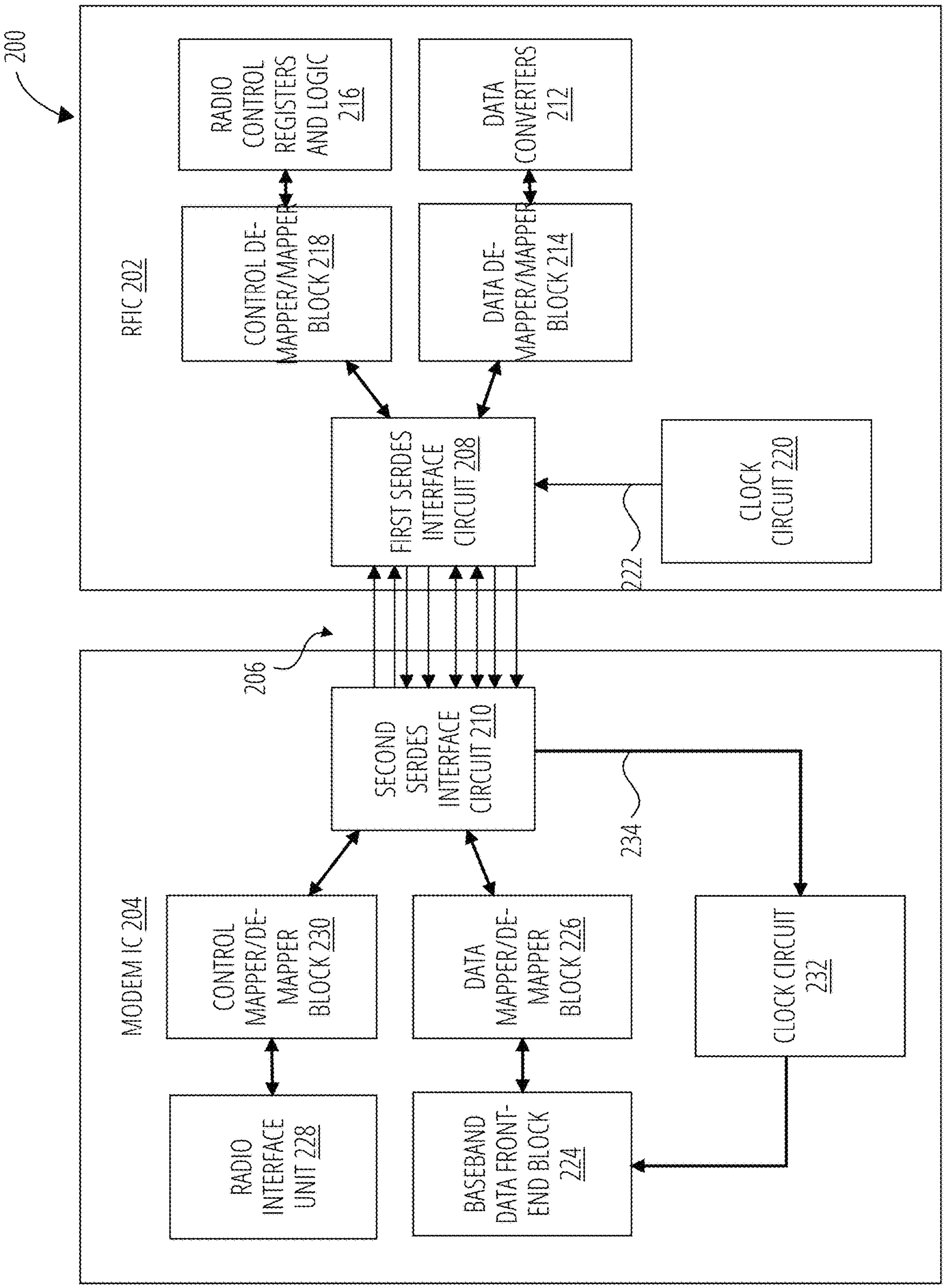
FIG. 2 is a block diagram of serializer/deserializer (SerDes) data and control paths between an RF tile and a modem IC of a wireless communication subsystem according to at least one embodiment.

FIG. 2 is a block diagram of SerDes data and control paths between an RF tile and a modem IC of a wireless communication subsystem 200 according to at least one embodiment. The wireless communication subsystem 200 includes an RFIC 202 and a modem IC 204. The RFIC 202 includes one or more RF tiles, although only one RF tile is illustrated for the following description. The RFIC 202 and the modem IC 204 communicate data and control signals over a SerDes interface 206 using a first SerDes interface circuit 208 and a second SerDes interface circuit 210, respectively. The RFIC 202 also includes data converters 212, data de-mapper/mapper block 214, radio control registers and logic 216, control de-mapper/mapper block 218, and clock circuit 220 as described in more detail below. The modem IC 204 includes a baseband data front-end block 224, data mapper/de-mapper block 226, a radio interface unit 228, control mapper/de-mapper block 230, and clock circuit 232 as described in more detail below.

In at least one embodiment, the first SerDes interface circuit 208 can perform multiplexing, equalization, feedback, and clock and data recovery operations. Similarly, the second SerDes interface circuits 210 can perform multiplexing, equalization, feedback, and clock and data recovery operations. The first SerDes interface circuit 208 and second SerDes interface circuit 210 can communication data and control signals over six data lines and two clock lines. Alternatively, other numbers of data and clock lines can be used between the first SerDes interface circuit 208 and second SerDes interface circuit 210.

In general, the SerDes interface 206 between the RFIC 202 and modem IC 204 can streamline the numerous data and control connections into a serialized high-speed link (e.g., operating at 1920 MHz). This can be achieved by serializing a 12-bit parallel inputs and outputs of the data converters and collating the real-time hardware control lines into a synchronized and serialized control mechanism using the first SerDes interface circuit 208 and 210 to meet latency requirements prescribed the connectivity baseband. In at least one embodiment, the SerDes interface 206 can operate at a maximum speed of 1920 Mbps, and is synchronized with a SerDes clock 222 (e.g., 1920 MHz clock) generated by the clock circuit 220 on the RFIC 202. The clock circuit 220 can include a clock source and clock distribution circuitry as described in more detail below with respect to FIG. 7. In at least one embodiment, the clock circuit 220 includes a baseband PLL (BB PLL). The clock second SerDes interface circuit 210 can receive the SerDes clock 222 over the clock lines of the SerDes interface 206 can produce a recovered SerDes clock 234. The clock circuit 232 can use the recovered SerDes clock 234 to generate baseband clocks that are phased matched outputs at various frequencies (e.g., 960 MHz, 320 MHz, 160 MHz, 120 MHz, 80 MHz, 40 MHz, etc.). The clock circuit 232 can include clock distribution circuitry to distribute different clocks to different blocks of the modem IC 204. For example, the clock circuit 232 can provide these phased matched output signals to the baseband data front-end block 224.

The radio control registers and logic 216 can be used to control setting, parameters, configurations of the radio according to the radio technology being implemented. The radio control registers and logic 216 can be programmed or reprogrammed using control signals received from the control de-mapper/mapper block 218. During operation, a radio interface unit 228 can send control signals to the control mapper/de-mapper block 230. The control mapper/de-mapper block 230 can generate mapped control signals and send the mapped control signals to the RFIC 202 using the second SerDes interface circuit 210. The first SerDes interface circuit 208 receives the mapped control signals via the data lines (or dedicated control lines) from the second SerDes interface circuit 210 and sends the mapped control signals to the control de-mapper/mapper block 218 to de-map the mapped control signals to recreate the control signals. The control de-mapper/mapper block 218 can send the recreated control signals to the radio control registers and logic 216. Also, during operation, the baseband data front-end block 224 can send data to be transmitted to the data mapper/de-mapper block 226. The data mapper/de-mapper block 226 can handle serialization and synchronization of data. The data mapper/de-mapper block 226 can generate mapped data and send the mapped data to the RFIC 202 using the second SerDes interface circuit 210. The first SerDes interface circuit 208 receives the mapped data via the data lines from the second SerDes interface circuit 210 and sends the mapped data to the data de-mapper/mapper block 214 to de-map the mapped data to recreate the data. The data de-mapper/mapper block 214 can send the recreated data to the data converters 212. As described above, the data converters 212 can include one or more ADCs and one or more DACs to convert between the analog and digital domains. In this data path, the data converters 212 converts the data to analog signals for the front-end circuitry coupled to the one or more antennas. Similarly, the data converters 212 can receive analog signals from the front-end circuitry to be processed by the baseband data front-end block 224. In this data path, the data converters 212 sends the data to the data de-mapper/mapper block 214 that generates mapped data and send the mapped data to the first SerDes interface circuit 208, which sends the mapped data to the second SerDes interface circuit 210. The second SerDes interface circuit 210 sends the data to the data mapper/de-mapper block 226 to de-map the data and send it to the baseband data front-end block 224.

As shown in FIG. 2, the Data Mapper (data de-mapper/mapper block 214 and data mapper/de-mapper block 226) handles the serialization, deserialization, and synchronization of data, whereas the Control Mapper (control de-mapper/mapper block 218 and control mapper/de-mapper block 230) handles the same for control signals. An example of a data/control mapper/de-mapper is illustrated and described below with respect to FIG. 3.

Figure 3:
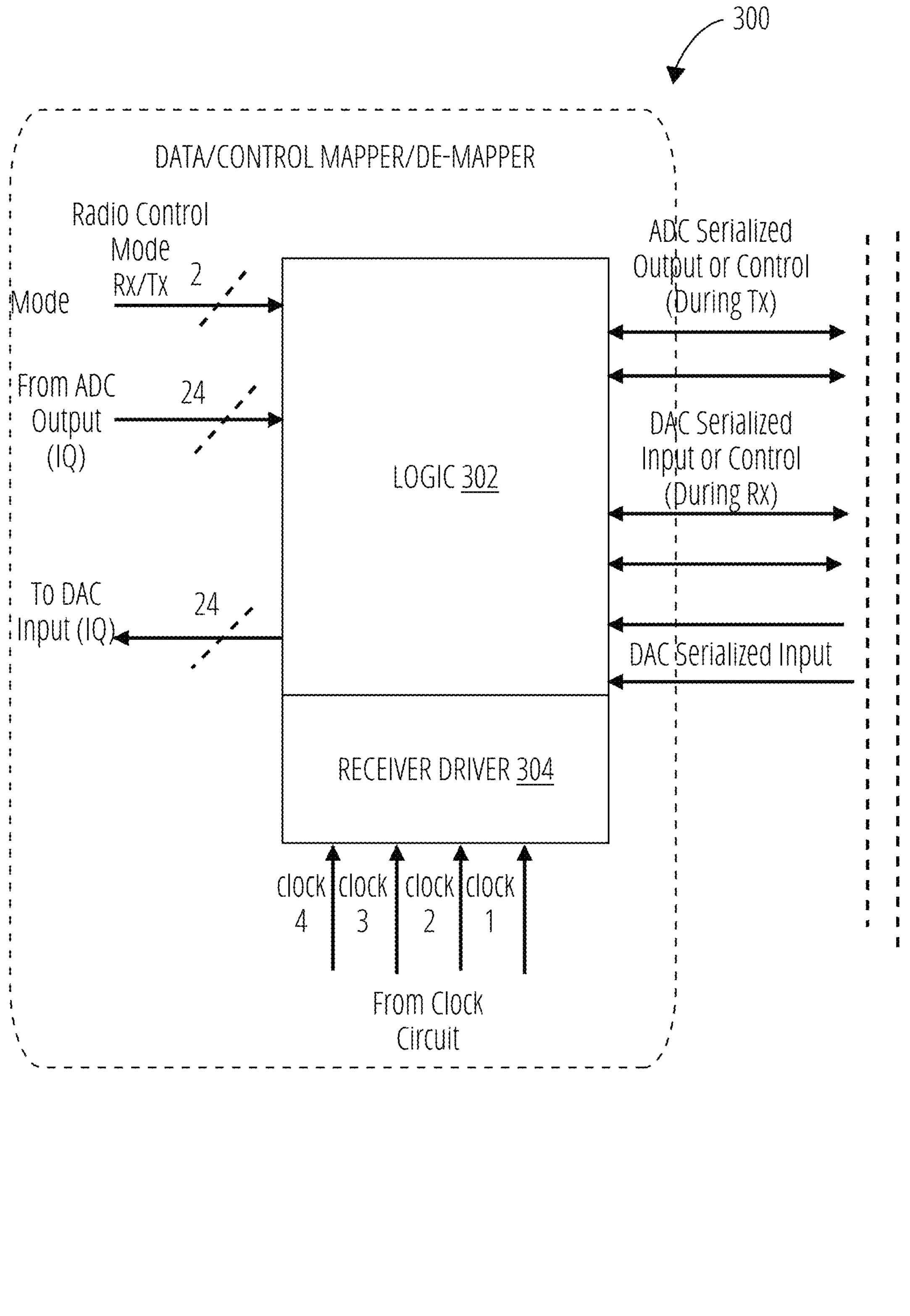
FIG. 3 is a block diagram of a data/control mapper/demapper block according to at least one embodiment.

FIG. 3 is a block diagram of a data/control mapper/de-mapper block 300 according to at least one embodiment. The data/control mapper/de-mapper block 300 can be any of the data mapper/de-mapper block 226, data de-mapper/mapper block 214, control mapper/de-mapper block 230, control de-mapper/mapper block 218 of FIG. 2. The data/control mapper/de-mapper block 300 includes logic 302 and receiver driver 304 for the BBPLL clock. The logic 302 can include serializer logic, deserializer logic, symbol encoder, symbol decoder, and an End of Word Delimiter to implement the following functionality: ADC serializer/deserializer, DAC serializer/deserializer, a BBPLL clock, and bi-directional lines. For the ADC serializer/deserializer, the serializer/deserializer logic can include a 12-to-1 serializer (on the radio) and a 1-to-12 de-serializer (on the baseband). Therefore, the serializer can take the I (In-phase) and Q (Quadrature), which represent the real and imaginary components of the signal outputs from the ADC (Radio) as 24 bits (12b I, 12b Q) of parallel data inputs and serializes them into 2 data streams for transport over the interface. The baseband (Modem) utilizes the de-serializer to invert this operation and feed the 24 parallel lines to the modem. For the DAC Serializer/De-serializer, there can be a 6-to-1 serializer (on Baseband) as the DACs runs 2× faster than the ADCs in at least one embodiment. The DAC de-serializer takes in the four data lines of serialized data stream from the baseband and converts it back into 24 bits of parallel data for driving the DAC (on Radio). For the BBPLL clock, the Data Mapper on the radio provides two lines of buffered BBPLL differential clock output at 1920 MHz. These clock signals are taken as inputs on the baseband side and are crucial for synchronizing data transmission and reception processes over the Ser-Des lines. For the bi-directional lines, two ADC lines and two DAC lines can be designated as bi-directional. These lines serve a dual purpose: a) Data Transmission; and Mode Control. In the data transmission mode, these lines transmit data from the ADC serializer to the DAC de-serializer. In the mode control mode, these lines are utilized for mode control operations, as specified by the Mode Control mapper. This enables the Data Mapper to switch between different modes of operation, adapting to the needs of the communication system. The Control Mapper/De-Mapper drives or interprets the mode control lines to determine the current mode of operation. Based on the mode, it utilizes the appropriate serialization lines on the interface and generates or parses the mode control frame and manages the control transactions between the baseband and the modem within the latency tolerances. The Control Mapper/De-Mapper utilizes the half duplex nature of Wi-Fi®, Bluetooth® and 15.4 systems to switch between the DAC lines during Wi-Fi® RX and ADC lines during Wi-Fi® TX.

In at least one embodiment, the Control Mapper/Fe-mapper can operate using a clock line that provides the timing signal for the operations and divides the operation into discrete cycles. In at least one embodiment, the Control Mapper/De-Mapper is operated using a 960 MHz derived from the BBPLL Clock Distribution. The mode control line determines the mode of operation, distinguishing between write (TX) and read/acknowledge (RX) operations. In at least one embodiment, the data/control mapper/de-mapper block 300 operates over a total of 16 clock cycles and the first clock cycle determines whether it is a write or read/acknowledge operation. If the mode control line is high at the beginning of the cycle, it indicates a write operation and if low it signifies a read or acknowledge operation. Following the write/read operation, the next 7 clock cycles are dedicated to address and the subsequent 8 clock cycles are used for transmitting or receiving data, such as illustrated in FIG. 4A and FIG. 4B.

Figure 4A:
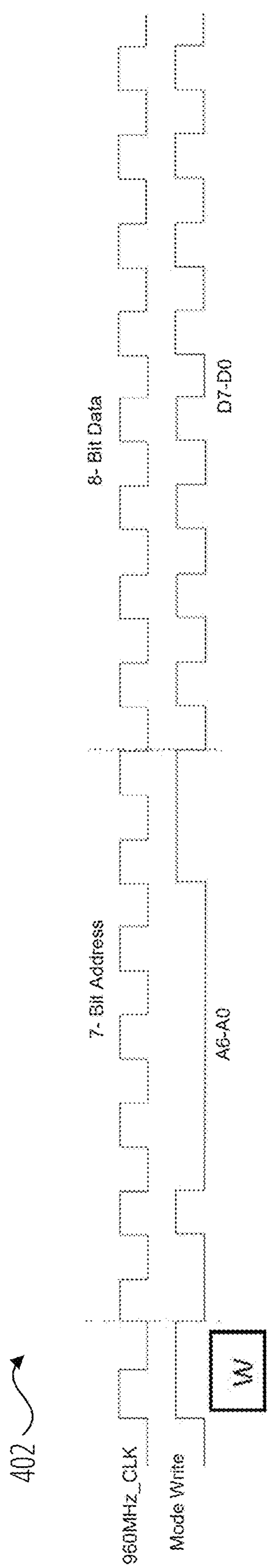
FIG. 4A is a signal diagram showing a write operation according to at least one embodiment.

FIG. 4A is a signal diagram showing a write operation 402 according to at least one embodiment. As described above, the data/control mapper/de-mapper block 300 operates over a total of 16 clock cycles. The first clock cycle can be used to determine whether it is a write operation 402 or a read operation 404 (read/acknowledge operation). If the mode control line is high at the beginning of the cycle, it indicates the write operation 402. If the mode control line indicates the write operation 402, the next 7 clock cycles are dedicated to the address and the subsequent 8 clock cycles are used for transmitting data.

Figure 4B:
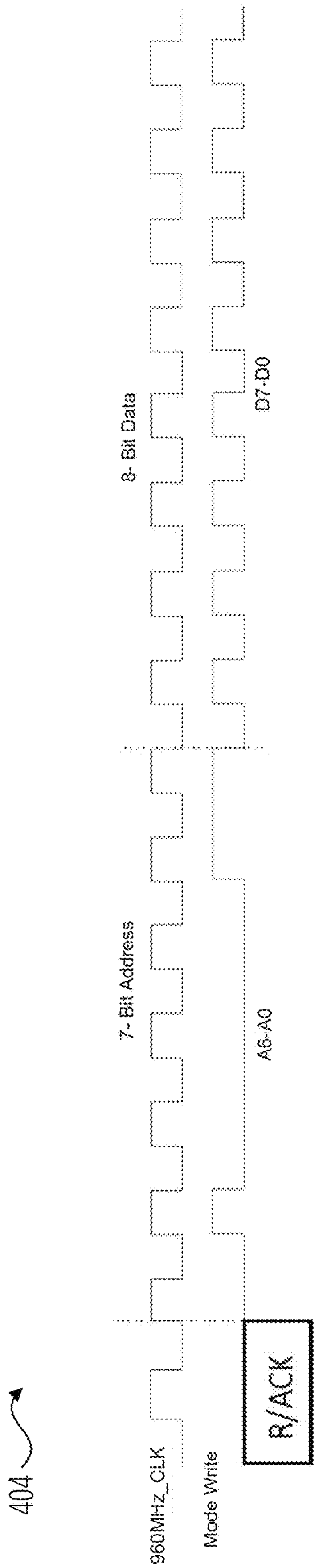
FIG. 4B is a signal diagram showing a read operation according to at least one embodiment.

FIG. 4B is a signal diagram showing a read operation 404 according to at least one embodiment. As described above, the data/control mapper/de-mapper block 300 operates over a total of 16 clock cycles. The first clock cycle can be used to determine whether it is a write operation 402 or a read operation 404 (read/acknowledge operation). If the mode control line is low at the beginning of the cycle, it indicates the read operation 404. If the mode control line indicates the read operation 404, the next 7 clock cycles are dedicated to the address and the subsequent 8 clock cycles are used for receiving data. In other embodiments, different number of bits and different orders can be used to address and data.

For control transactions, the data/control mapper/de-mapper block 300 can evaluate a mode control frame, including 7 bits of address and 8 bits of data, such as illustrated and described below with respect to FIG. 5.

Figure 5:
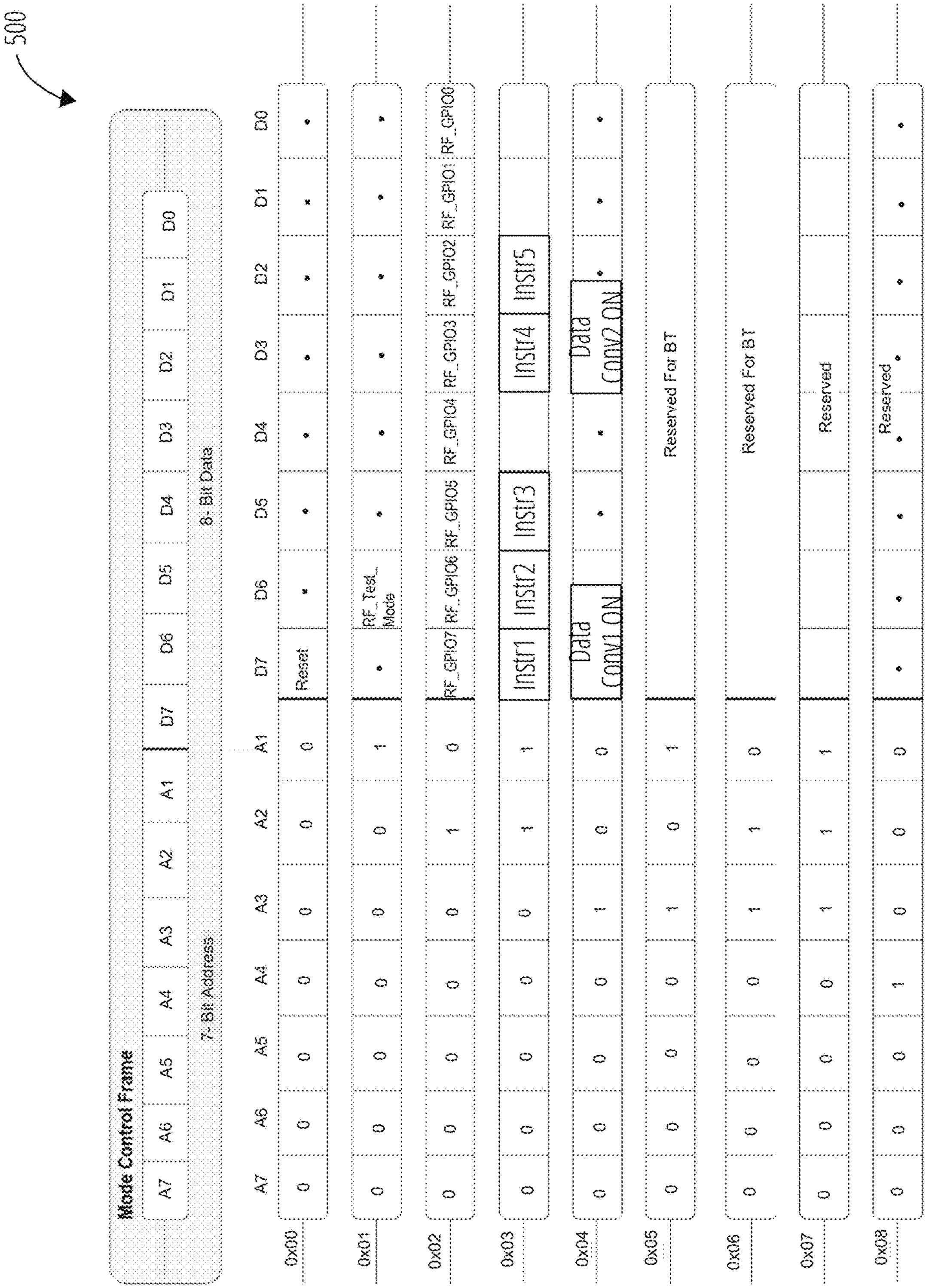
FIG. 5 illustrates a structure of an example mode control frame with various different control modes according to at least one embodiment.

FIG. 5 illustrates a structure of an example mode control frame 500 with various different control modes according to at least one embodiment. As described herein, the control transactions handled by the data/control mapper/de-mapper block 300 can be paired with the mode control frame 500. The mode control frame 500 include 7 bits of address and 8 bits of data. The 7 bits of address can be used to encode a mode, such as illustrated in the 8 example modes illustrated in FIG. 5. For example, an address of 0 can be used for a reset operation. In at least one embodiment, an instruction buffer can be used to store any concurrent inputs to the data/control mapper/de-mapper block 300.

As described above with respect to FIG. 2, there can be 6 data lines and 2 clock lines for the SerDes interface 206. In addition, to these 8 data and clock lines, six additional lines can be used for a SPI interface between the RFIC 202 and the modem IC 204. SPI is a type of synchronous serial communication protocol primarily used for short-distance communication in embedded systems. It enables data transfer between a primary device (also referred to as principal device or controller device) and one or more peripheral devices (also referred to as follower device or secondary device) using a full-duplex mode. SPI operates with an architecture that utilizes four main signals: 1) MISO representing data sent from the peripheral device to the primary device; 2) MOSI representing data sent from the primary device to the peripheral device; 3) SPI_CK representing a serial clock generated by the primary device to synchronize data transmission; and 4) SPI_CS representing a single to select and communication with a specific peripheral device. A SPI interface can provide high data transfer speeds, simple hardware connections, and efficient use of pins. The SPI interface can be a consolidated interface between multiple SPI circuits and the first controller 138 (modem IC), as illustrated and described below with respect to FIG. 2.

Figure 6:
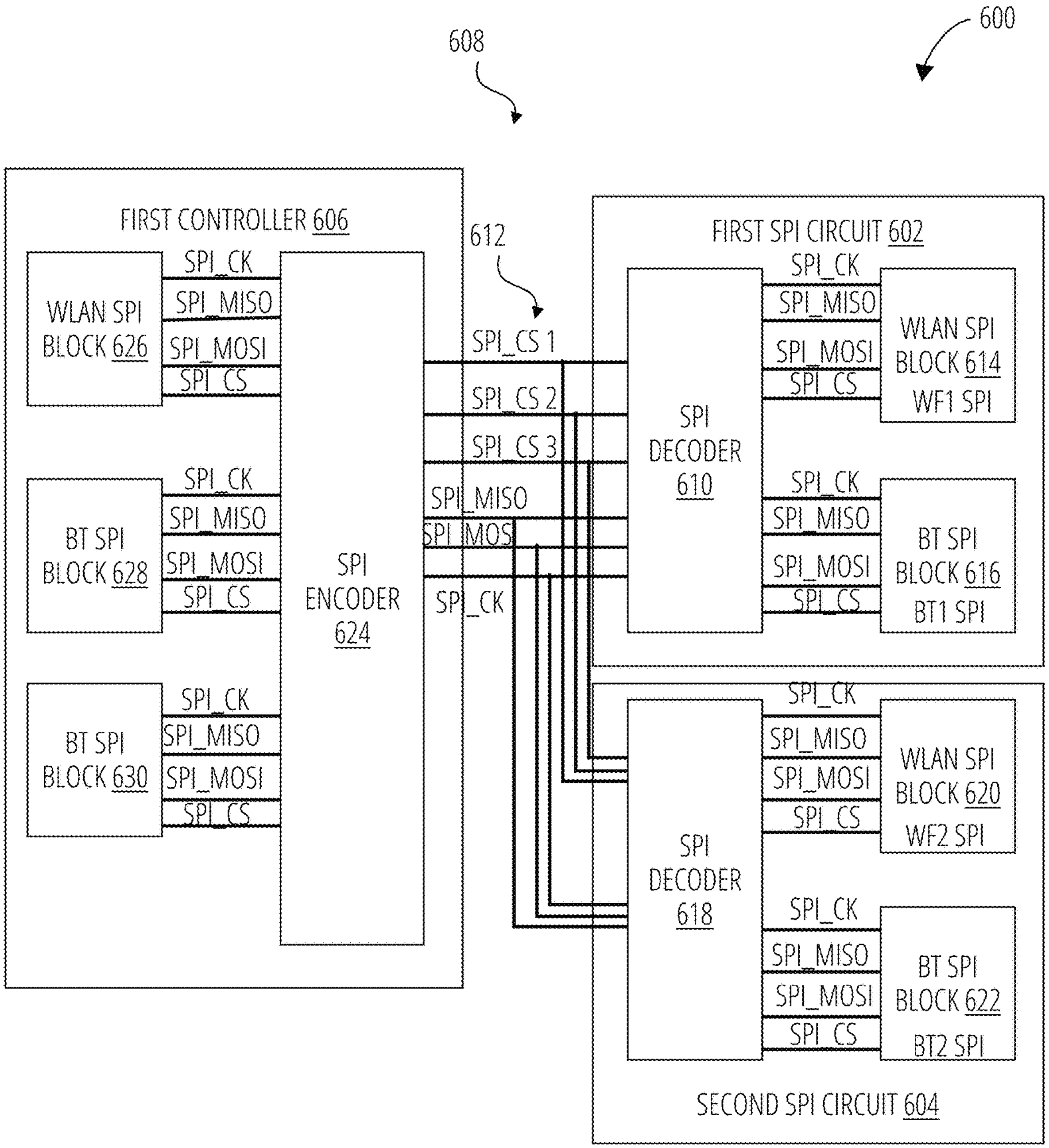
FIG. 6 is a block diagram of Serial Peripheral Interface (SPI) data and control paths between two RF tiles and a modem IC of a wireless communication subsystem according to at least one embodiment.

FIG. 6 is a block diagram of SPI data and control paths between two RF tiles and a modem IC of a wireless communication subsystem 600 according to at least one embodiment. The wireless communication subsystem 600 includes a first SPI circuit 602 and a second SPI circuit 604 coupled to a first controller 606 via an SPI interface 608. The first SPI circuit 602 is similar to the first SPI circuit 118 of FIG. 1 and is considered a peripheral device. The second SPI circuit 604 is similar to the second SPI circuit 128 of FIG. 1 and is considered a peripheral device. The first controller 606 is similar to the first controller 138 of FIG. 1 and is considered a primary device. As illustrated in FIG. 6, SPI circuitry is implemented in the first controller 606. In other embodiments, the modem IC can include a third SPI circuit to handle the SPI interface 608 between the SPI circuits of the RF tiles and the modem IC.

In at least one embodiment, the SPI is a commonly used communication protocol for transferring data between devices in embedded systems. A SPI typically includes four wires: SPI_CLK, SPI_MISO, SPI_MOSI, and SPI_CK as described above. The SPI interface 608 can be used for communication (first controller 606) between the baseband and multiple RF tiles (radios) using an SPI encoder 624 and SPI decoders at each of the RF tiles, such as SPI decoder 610 in a first RF tile and SPI decoder 618 in a second RF tile. SPI consolidation is needed to reduce the what-would-be 16 IOs needed for supporting a 2×2 configuration with 4 radios. As illustrated in FIG. 6, the SPI encoder 624 and SPI decoders that will buffer instructions and help encode/decode the appropriate SPI chip select (CS) states. The SPI encoder 624 and SPI decoder 610 and SPI decoder 618 can use a mapping of three CS lines 612 (SPI_CS 1, SPI_CS 2, SPI_CS 3) to index four SPI interfaces of four radios. That is, the WLAN SPI block 614, BT SPI block 616, WLAN SPI block 620, and BT SPI block 622 can be individually selecting, as well as the WLAN SPI block 614 and WLAN SPI block 620 collectively selected for the five different radio configurations (WF1, WF1+WF2, W2, BT1, and BT2). The communication between the SPI Encoder 624 and SPI decoder 610 and SPI decoder 618 can be similar to the standard SPI except it can be clocked at a higher frequency (e.g., 80 MHz instead of 4 or 8 MHz) to minimize any latency considerations. As described above, clock circuits can be used to generate clock signals at different frequencies. The clocks can be synchronized between the different blocks of the wireless communication subsystem. An example of a clock circuit used to generate the clock signals is illustrated and described with respect to FIG. 7.

Figure 7:
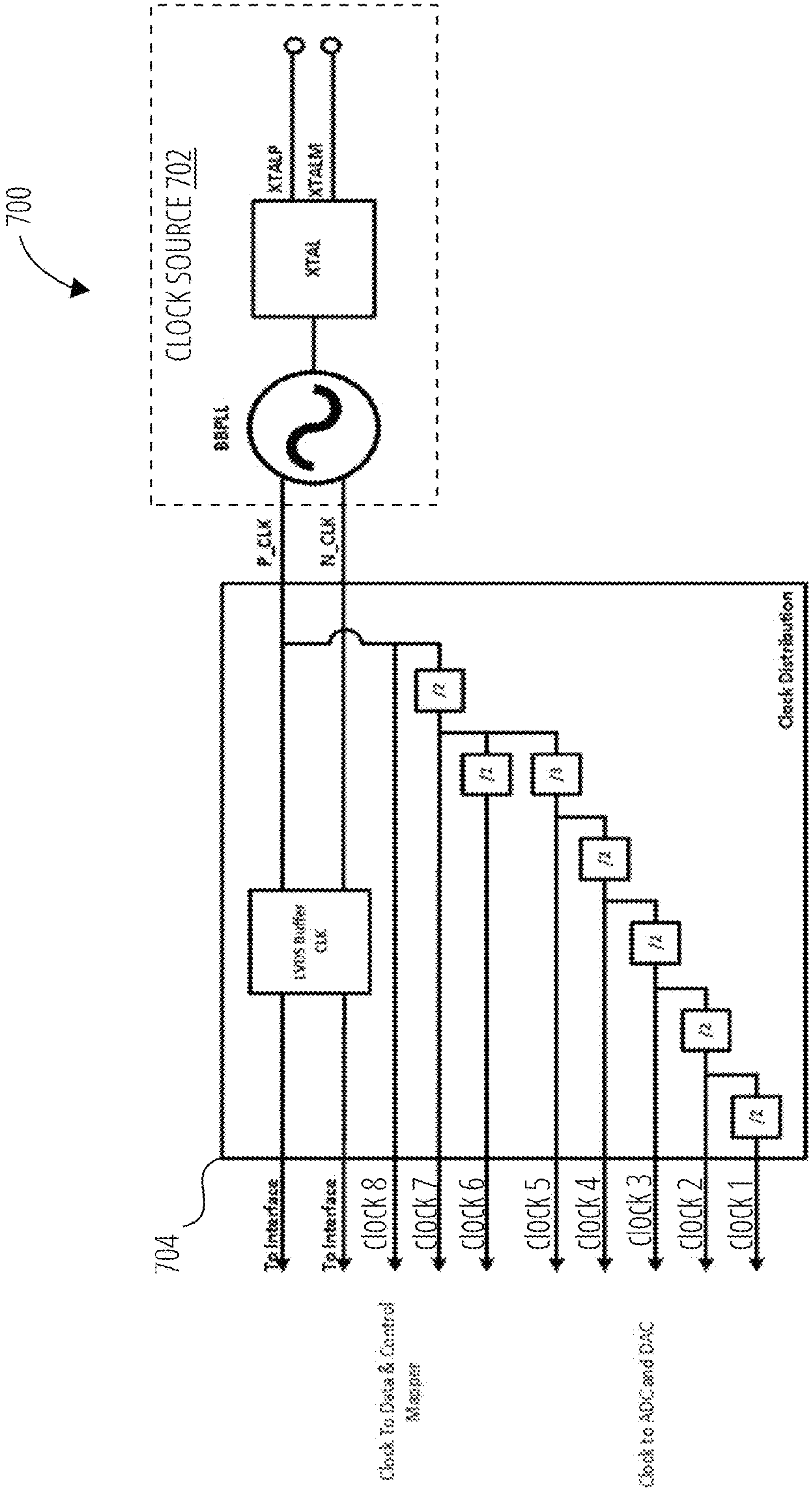
FIG. 7 is a block diagram of a clock circuit with a clock source and clock distribution circuitry according to at least one embodiment.

FIG. 7 is a block diagram of a clock circuit 700 with a clock source 702 and clock distribution circuitry 704 according to at least one embodiment. The clock source 702 can include a crystal oscillator interface that is coupled to an external crystal oscillator. The crystal oscillator interface provide a signal to a BBPLL that generates a clock signal as a differential signal (e.g., P_clock, N_clock). The clock distribution circuitry 704 can receive the different clock signal and buffer and/or generate multiple derivative clock signals or different phase signals from the clock signal received from the clock source 702. Clock distribution by the clock distribution circuitry 704 can ensure proper timing and synchronization within a data mapper, especially when dealing with high-frequency signals such as those generated by the clock source 702 (e.g., BBPLL). For example, the input clock signal originates from the BBPLL and has a frequency of 1920 MHz. The BBPLL generates a stable and precise clock signal synchronized with the baseband frequency requirements of the system. The clock distribution circuitry 704 can generate multiple divided clock outputs by dividing the input clock signal using different divider ratios. The divider ratios can be chosen to provide a range of frequencies suitable for various components within the data mapper. The clock distribution system ensures that all distributed clock signals maintain precise phase and frequency relationships with the input clock signal. Proper timing and synchronization can ensure that all components within the data mapper operate as expected without data loss or corruption. Also, different components of the interface can use different clock frequencies based on their processing speed and timing constraints. For example, the serializer may use a clock signal with a higher frequency (e.g., 1920 MHz) to handle the rapid serialization of data, while other components may operate at lower frequencies. The clock distribution circuitry 704 can also provide clocks to the data converters (RFIC) and baseband circuits (modem IC) to maintain timing and synchronization across all the domains in the primary data paths.

As described above, the second SerDes interface circuit 210 can receive clock signals from the SerDes clock 222 of the RFIC 202 over the SerDes interface 206, and the second SerDes interface circuit 210 can perform clock recovery on the clock and data lines. The encoding for data and control lines can be performed by utilizing transitions with a constant direct current (DC) balance.

As described herein, the interfaces described above allow consolidation of data and control lines to support multiple RF tiles. For example, in a system with four radios that uses parallel data lines and SPI lines would need at least 48 lines for IQ data (12 bits each) for Tx lines (DAC) and Rx lines (ADC), 4 SPI lines, and two clock lines per radio. So, two radios would need 96 lines. Using the SerDes interface and SPI interfaces described above, a 1×1 configuration would only need 13 lines (18 with five lines to spare for optimization), and a 2×2 configuration would need 21 lines (26 lines with 5 lines to spare for optimization).

The operations of the various blocks and components described above can be performed by processing logic that may comprise hardware (e.g., circuitry, dedicated logic, programmable logic, microcode, etc.), software (e.g., instructions run on a processing device to perform hardware simulation), or a combination thereof. Also, the embodiments described herein can be deployed in a wireless device, such as described in FIG. 8.

Figure 8:
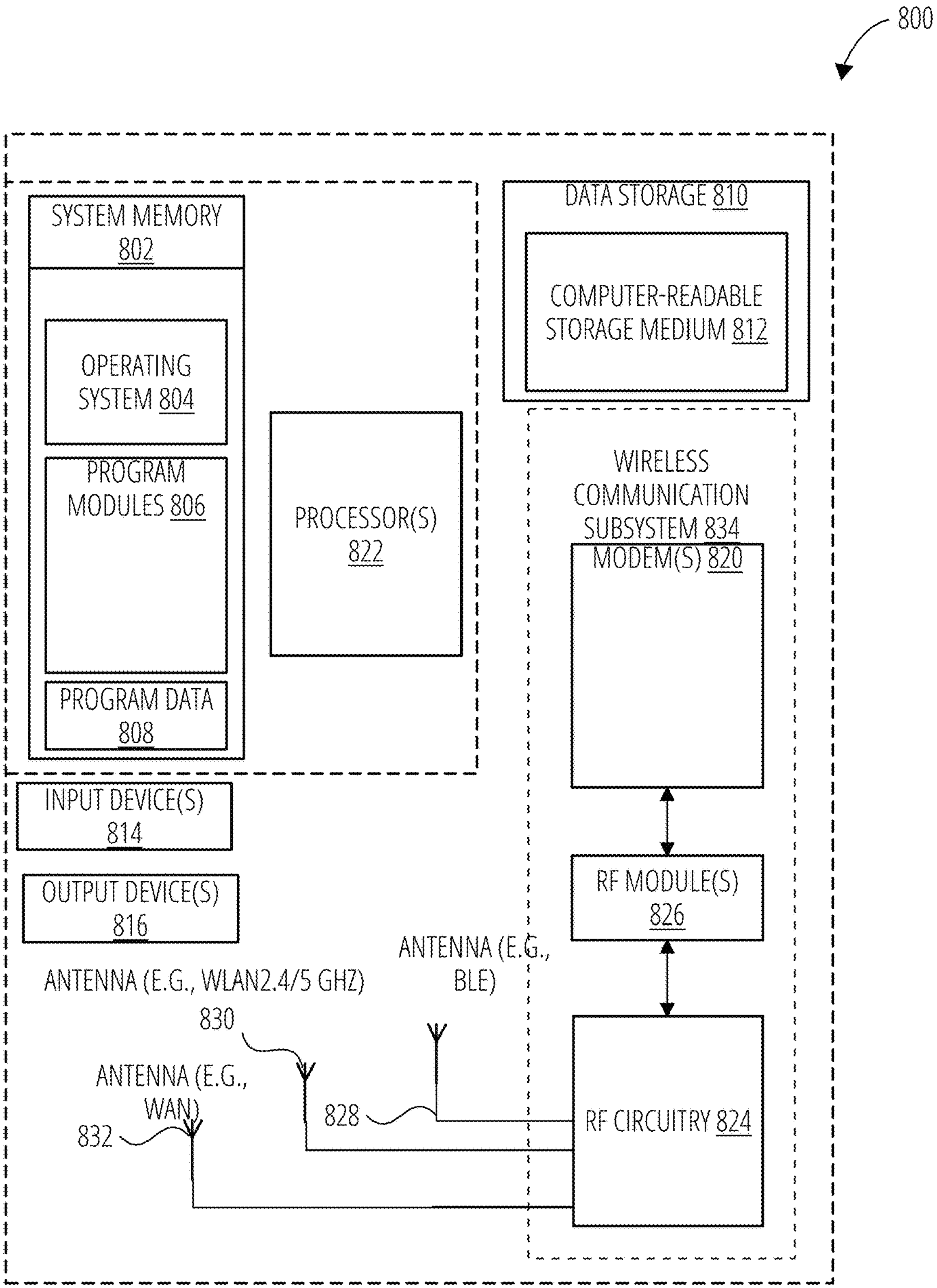
FIG. 8 is a block diagram of a wireless device according to one embodiment.

FIG. 8 is a block diagram of a wireless device 800 according to one embodiment. The wireless device 800 may correspond to any devices described above with respect to FIG. 1 to FIG. 7. In the depicted embodiment, the wireless device 800 includes a wireless communication subsystem 834. The wireless communication subsystem 834 can be the wireless communication subsystem 100 of FIG. 1. In another embodiment, the wireless communication subsystem 834 can be the wireless communication subsystem 200 of FIG. 2. Alternatively, the wireless device 800 may be other electronic devices and have fewer or more components as described and illustrated in FIG. 8.

The wireless device 800 includes one or more processor (s) 822, such as one or more Central Processing Units (CPUs), microcontrollers, field-programmable gate arrays, or other types of processors. The wireless device 800 also includes system memory 802, which may correspond to any combination of volatile and/or non-volatile storage mechanisms. The system memory 802 stores information that provides operating system component 804, various program modules 806, program data 808, and/or other components. In one embodiment, the system memory 802 stores instructions of methods to control the operation of the wireless device 800. The wireless device 800 performs functions by using the processor(s) 822 to execute instructions provided by the system memory 802. In one embodiment, the program modules 806 may include processing logic to perform some or all of the operations described herein.

The wireless device 800 also includes a data storage device 810 that may be composed of one or more types of removable storage and/or one or more types of non-removable storage. The data storage device 810 includes a computer-readable storage medium 812 on which is stored one or more sets of instructions embodying any of the methodologies or functions described herein. Instructions for the program modules 806 may reside, completely or at least partially, within the computer-readable storage medium 812, system memory 802, and/or within the processor(s) 822 during execution thereof by the wireless device 800, the system memory 802 and the processor(s) 822 also constituting computer-readable media. The wireless device 800 may also include one or more input device(s) 814 (keyboard, mouse device, specialized selection keys, etc.) and one or more 816 (displays, printers, audio output mechanisms, etc.).

The wireless communication subsystem 834 can include includes one or more modem(s) 820 to allow the wireless device 800 to communicate via wireless connections (e.g., such as provided by the wireless communication system) with other computing devices, such as remote computers, an item providing system, and so forth. The modem(s) 820 can be connected to one or more radio frequency (RF) modules 826. The RF modules 826 may be a WLAN module, a Wide Area Network (WAN) module, a wireless personal area network (WPAN) module, a Global Positioning system (GPS) module, or the like. The modem(s) 820, the RF module(s) 826, and RF circuitry 824 can be implemented using the architectures described above. The antenna structures (e.g., antenna 828, 830, 832) are coupled to the RF circuitry 824, which is coupled to the modem(s) 820. The RF circuitry 824 may include radio front-end circuitry, antenna switching circuitry, impedance matching circuitry, or the like. The antenna(s) 828, 830, 832 may be GPS antennas, a near field communication (NFC) antennas, other WAN antennas, WLAN or WPAN antennas, or the like. The modem(s) 820 allows the wireless device 800 to handle both voice and non-voice communications (such as communications for text messages, multimedia messages, media downloads, web browsing, etc.) with a wireless communication system. The modem(s) 820 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed downlink packet access (HSDPA), Wi-Fi®, Long Term Evolution (LTE) and LTE Advanced (sometimes generally referred to as 4G), 5G, 6G, etc.

The modem(s) 820 may generate signals and send these signals to the antenna 828 of a first type (e.g., BLE), antenna 830 of a second type (e.g., WLAN 2.4/5 GHZ), and/or antenna 832 of a third type (e.g., WAN), via RF circuitry 824, and RF module(s) 826 as described herein. The antennas 828, 830, 832 may be configured to transmit in different frequency bands and/or using different wireless communication protocols. The antennas 828, 830, 832 may be directional, omnidirectional, or non-directional antennas. In addition to sending data, antennas 828, 830, 832 may also receive data, which is sent to appropriate RF modules connected to the antennas. One of the antennas 828, 830, 832 may be any combination of the antenna structures described herein.

In one embodiment, the wireless device 800 establishes a first connection using a first wireless communication protocol, and a second connection using a different wireless communication protocol. The first wireless connection and second wireless connection may be active concurrently, for example, if a wireless device is receiving a media item from another wireless device via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of a wireless mesh network and the second wireless connection may be associated with serving a content file to a client consumption device, as described herein.

In the above description, numerous details are set forth. It will be apparent, however, to one of ordinary skill in the art having the benefit of this disclosure, that embodiments may be practiced without these specific details. In some instances, well-known structures and devices are shown in block diagram form rather than in detail in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is used herein and is generally conceived to be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining," "sending," "receiving," "scheduling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, Read-Only Memories (ROMs), compact disc ROMs (CD-ROMs), and magnetic-optical disks, Random Access Memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
a radio frequency integrated circuit (RFIC) comprising:
a first radio frequency tile (RF tile) with first data converters and a first radio frequency front-end (RFFE) circuit for a first radio technology, second data converters and a second RFFE circuit for a second radio technology, a first modem for the second radio technology, a first serializer/deserializer (SerDes) interface circuit, and a first serial peripheral interface (SPI) circuit; and
a second RF tile with third data converters and a third RFFE circuit for the first radio technology, fourth data converters and a fourth RFFE circuit for the second radio technology, a second modem for the second radio technology, a second SerDes interface circuit, and a second SPI circuit; and
a modem integrated circuit (IC) operatively coupled to the RFIC, wherein the modem IC comprises:
a third SerDes interface circuit operatively coupled to the first and second SerDes interface circuits;
a first baseband processor for the first radio technology;
a first controller for the first radio technology;
a second baseband processor for the second radio technology; and
a second controller for the second radio technology.

2. The wireless device of claim 1, wherein the RFIC and the modem IC are integrated on a common carrier substrate.

3. The wireless device of claim 1, wherein the RFIC further comprises:
a third RF tile operatively coupled to the modem IC, wherein the third RF tile and the first RF tile are identical; and
a fourth RF tile operatively coupled to the modem IC, wherein the fourth RF tile and the second RF tile are identical.

4. The wireless device of claim 1, further comprising a second RFIC comprising:
a third RF tile operatively coupled to the modem IC, wherein the third RF tile and the first RF tile are identical; and
a fourth RF tile operatively coupled to the modem IC, wherein the fourth RF tile and the second RF tile are identical, wherein the modem IC, the RFIC, and the second RFIC are integrated on a common carrier substrate or integrated into a common semiconductor package.

5. A wireless communication subsystem comprising:
a plurality of radio frequency tiles (RF tiles), each of the plurality of RF tiles comprising identical hardware comprising a first serializer/deserializer (SerDes) interface circuit, the plurality of RF tiles further comprising a first RF tile comprising:
first data converters and a first RFFE circuit corresponding to a first radio technology of the plurality of radio technologies,
second data converters and a second RFFE circuit corresponding to a second radio technology of the plurality of radio technologies,
a first modem for the second radio technology, and
a first serial peripheral interface (SPI) circuit;
a plurality of baseband processors, each of the plurality of baseband processors implementing one of the plurality of radio technologies; and
a second SerDes interface circuit coupled between the plurality of baseband processors and the first SerDes interface circuit of each of the plurality of RF tiles.

6. The wireless communication subsystem of claim 5, wherein the first RF tile comprises:
the first SerDes interface circuit; and
the plurality of RF tiles comprises a second RF tile comprising:
third data converters and a third RFFE circuit corresponding to the first radio technology;
fourth data converters and a fourth RFFE circuit corresponding to the second radio technology;
a second modem for the second radio technology;
the first SerDes interface circuit; and
a second SPI circuit.

7. The wireless communication subsystem of claim 6, further comprising:
a first controller coupled to the first SPI circuit and the second SPI circuit; and
a second controller coupled to the first modem and the second modem.

8. The wireless communication subsystem of claim 6, wherein the plurality of RF tiles comprises:
a third RF tile operatively coupled to the second SerDes interface circuit, wherein the third RF tile and the first RF tile are identical; and
a fourth RF tile operatively coupled to the second SerDes interface circuit, wherein the fourth RF tile and the second RF tile are identical.

9. The wireless communication subsystem of claim 5, wherein the plurality of RF tiles, the plurality of baseband processors, and the second SerDes interface circuit are integrated on a common carrier substrate or integrated into a common semiconductor package.

10. The wireless communication subsystem of claim 5, wherein the plurality of RF tiles are integrated into a first integrated circuit, and wherein the plurality of baseband processors and the second SerDes interface circuit are integrated into a second integrated circuit.

11. The wireless communication subsystem of claim 10, wherein the plurality of RF tiles further comprises:
a first RF tile operatively coupled to the second SerDes interface circuit;
a second RF tile operatively coupled to the second SerDes interface circuit;
a third RF tile operatively coupled to the second SerDes interface circuit, wherein the third RF tile and the first RF tile are identical; and
a fourth RF tile operatively coupled to the second SerDes interface circuit, wherein the fourth RF tile and the second RF tile are identical.

12. The wireless communication subsystem of claim 11, wherein the third and fourth RF tiles are integrated into the first integrated circuit.

13. A System on Chip (SoC) comprising:
a radio frequency (RF) subsystem comprising a plurality of radio frequency tiles (RF tiles), each of the plurality of RF tiles comprising identical hardware comprising a first serializer/deserializer (SerDes) interface circuit, the plurality of RF tiles further comprising a first RF tile comprising:

first data converters and a first RFFE circuit corresponding to a first radio technology of the plurality of radio technologies, second data converters and a second RFFE circuit corresponding to a second radio technology of the plurality of radio technologies, a first modem for the second radio technology, and a first serial peripheral interface (SPI) circuit;

and a modem subsystem operatively coupled to the RF subsystem, wherein the modem subsystem comprises:

a plurality of baseband processors, each of the plurality of baseband processors implementing one of the plurality of radio technologies; and a second SerDes interface circuit coupled between the plurality of baseband processors and the first SerDes interface circuit of each of the plurality of RF tiles.

14. The SoC of claim 13, wherein the first RF tile comprises:

the first SerDes interface circuit; and the plurality of RF tiles comprises a second RF tile comprising:

third data converters and a third RFFE circuit corresponding to the first radio technology;

fourth data converters and a fourth RFFE circuit corresponding to the second radio technology;

a second modem for the second radio technology;

the first SerDes interface circuit; and a second SPI circuit.

15. The SoC of claim 14, further comprising:

a first controller coupled to the first SPI circuit and the second SPI circuit; and a second controller coupled to the first modem and the second modem.

16. The SoC of claim 14, wherein the plurality of RF tiles comprises:

a third RF tile operatively coupled to the second SerDes interface circuit, wherein the third RF tile and the first RF tile are identical; and a fourth RF tile operatively coupled to the second SerDes interface circuit, wherein the fourth RF tile and the second RF tile are identical.

17. The SoC of claim 13, wherein the plurality of RF tiles, the plurality of baseband processors, and the second SerDes interface circuit are integrated on a common carrier substrate or integrated into a common semiconductor package.

18. The SoC of claim 13, wherein the plurality of RF tiles are integrated into a first integrated circuit, and wherein the plurality of baseband processors and the second SerDes interface circuit are integrated into a second integrated circuit.

19. The SoC of claim 18, wherein the plurality of RF tiles further comprises:

a first RF tile operatively coupled to the modem subsystem;

a second RF tile operatively coupled to the modem subsystem;

a third RF tile operatively coupled to the modem subsystem, wherein the third RF tile and the first RF tile are identical; and a fourth RF tile operatively coupled to the modem subsystem, wherein the fourth RF tile and the second RF tile are identical.

20. The SoC of claim 19, wherein the third and fourth RF tiles are integrated into the first integrated circuit.

* * * * *